US008369971B2

(12) United States Patent
Murrells et al.

(10) Patent No.: US 8,369,971 B2
(45) Date of Patent: Feb. 5, 2013

(54) MEDIA SYSTEM HAVING PREEMPTIVE DIGITAL AUDIO AND/OR VIDEO EXTRACTION FUNCTION

(75) Inventors: Nicholas Murrells, Hollywood, CA (US); Mark Sears, Simi Valley, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 1037 days.

(21) Appl. No.: 11/402,297

(22) Filed: Apr. 11, 2006

(65) Prior Publication Data

US 2007/0239699 A1    Oct. 11, 2007

(51) Int. Cl.
*G06F 17/00* (2006.01)
(52) U.S. Cl. .......... 700/94; 711/118; 711/120; 711/133; 711/135; 711/137; 711/138; 707/821; 707/826; 718/102; 718/103; 718/106
(58) Field of Classification Search ...................... 700/94
See application file for complete search history.

(56) References Cited

U.S. PATENT DOCUMENTS

| | | | | |
|---|---|---|---|---|
| 6,093,880 A * | 7/2000 | Arnalds | ...................... | 84/464 R |
| 6,502,194 B1 * | 12/2002 | Berman et al. | .................. | 726/28 |
| 6,857,074 B2 * | 2/2005 | Bobo, II | ........................ | 713/168 |
| 6,898,610 B2 * | 5/2005 | Hose et al. | ..................... | 707/205 |
| 6,985,932 B1 * | 1/2006 | Glaser et al. | ................... | 709/219 |
| 6,987,221 B2 * | 1/2006 | Platt | ............................... | 84/601 |
| 7,007,122 B2 * | 2/2006 | Solomon et al. | ............. | 710/240 |
| 7,046,588 B2 * | 5/2006 | Heo | ........................... | 369/32.01 |
| 7,234,026 B2 * | 6/2007 | Robbin et al. | ................ | 711/138 |
| 7,339,893 B2 * | 3/2008 | Regal et al. | ................... | 370/235 |
| 7,409,205 B2 * | 8/2008 | Mittal | ....................... | 455/414.1 |
| 7,412,532 B2 * | 8/2008 | Gondhalekar et al. | ........ | 709/231 |
| 7,457,915 B2 * | 11/2008 | Getzinger | ..................... | 711/113 |
| 2001/0030660 A1 * | 10/2001 | Zainoulline | .................... | 345/720 |
| 2002/0116476 A1 * | 8/2002 | Eyal et al. | ...................... | 709/219 |
| 2002/0180803 A1 * | 12/2002 | Kaplan et al. | ................... | 345/810 |
| 2004/0138948 A1 * | 7/2004 | Loomis | ............................ | 705/14 |
| 2004/0167856 A1 * | 8/2004 | Shibasaki et al. | ............... | 705/51 |
| 2004/0210593 A1 * | 10/2004 | Hirano et al. | ................. | 707/101 |
| 2004/0225746 A1 * | 11/2004 | Niell et al. | ..................... | 709/231 |
| 2005/0050557 A1 * | 3/2005 | Gabryjelski et al. | ........... | 720/600 |
| 2005/0066302 A1 * | 3/2005 | Kanade | .......................... | 717/100 |
| 2005/0090918 A1 * | 4/2005 | Sugiyama | ....................... | 700/94 |

(Continued)

*Primary Examiner* — Paul McCord
(74) *Attorney, Agent, or Firm* — Brinks Hofer Gilson & Lione (57) ABSTRACT

A media system is disclosed that uses preemptive recording of media files to reduce playback latency when media tracks are subsequently selected for playback during the recording process. The media system comprises a primary storage device capable of storing media files and a secondary storage device capable of reading digital media files from a removable storage medium. The system also includes a media player capable of playing media files stored on the primary storage device and a recorder that is connected to read digital media data from the secondary storage device. The recorder stores media files corresponding to the digital media data of the removable storage medium on the primary storage device. To reduce subsequent playback latency when media tracks are selected for playback during the recording process, the recorder automatically stores only predetermined portions of each media file read from the storage medium on the primary storage device when the removable storage medium is, for example, initially engaged with the secondary storage device. The preemptive recording may also occur at advantageous times other than the time at which the removable storage medium is initially engaged with the secondary storage device. Further, preemptive recording may be limited to the media files selected by the user for complete recording from the secondary storage device to the primary storage device.

19 Claims, 6 Drawing Sheets

U.S. PATENT DOCUMENTS

| | | | |
|---|---|---|---|
| 2005/0197725 A1* | 9/2005 | Alexander et al. | 700/94 |
| 2005/0229013 A1* | 10/2005 | Babowicz et al. | 713/193 |
| 2005/0278736 A1* | 12/2005 | Steelberg et al. | 725/34 |
| 2006/0010167 A1* | 1/2006 | Grace et al. | 707/104.1 |
| 2006/0135198 A1* | 6/2006 | Lee | 455/550.1 |
| 2006/0235550 A1* | 10/2006 | Csicsatka et al. | 700/94 |
| 2006/0274910 A1* | 12/2006 | Schul et al. | 381/334 |
| 2006/0288165 A1* | 12/2006 | Rosenbloom et al. | 711/115 |
| 2007/0070856 A1* | 3/2007 | Tebele | 369/85 |
| 2007/0277184 A1* | 11/2007 | Yasuda et al. | 719/320 |
| 2008/0021959 A1* | 1/2008 | Naghi et al. | 709/204 |
| 2008/0320481 A1* | 12/2008 | Peng | 718/103 |

* cited by examiner

Figure 7

MEDIA SYSTEM HAVING PREEMPTIVE DIGITAL AUDIO AND/OR VIDEO EXTRACTION FUNCTION

BACKGROUND OF THE INVENTION

1. Technical Field

The present invention is directed to a media system having preemptive media file extraction capability that may be used to reduce playback latency.

2. Related Art

Media systems may be capable of playing a wide range of different media file types. These media file types include, for example, various audio file formats as well as various video file formats. The media files may be streamed to the media system from the Internet, a subscriber network, or a local-area network. Some media systems are also capable of accessing media files from removable storage media such as, for example, audio CDs, video CDs, super audio CDs, audio DVDs, and video DVDs.

Media systems that are capable of reading media files from removable storage media may also include recording functions. The recording functions are used to transfer the media files from the removable storage media to a local primary storage device associated with the media system. The media files may be encoded to a different file format on the primary storage device.

When removable storage media is inserted into a media system having recording capability, the user may be presented with visual information through which media files may be selected for recording to the primary storage device. In some systems, recording of all selected media files must be completed before any of the media files can be played. From the standpoint of a user, the delay caused by the recording time may be unacceptable and reduce the perceived value of the media system.

Other systems may offer limited playback capability during the recording process. The limited playback systems, however, may experience unacceptable latency in the playback response. For example, if a user changes playback tracks of an audio CD during a concurrent playback/recording operation of a current track, it may take an undesirably long time for the system to access the new audio track on the CD, buffer an amount of the audio of the new track, and play the audio file. Therefore a need exists to reduce this delay.

SUMMARY

A media system is disclosed that uses preemptive recording of media files to reduce playback latency when media tracks are selected for playback while the media system is still engaged in the recording process. The media system comprises a primary storage device capable of storing media files and a secondary storage device capable of reading digital media files from a removable storage medium. The system also includes a media player capable of playing media files stored on the primary and secondary storage devices as well as a recorder that reads digital media data from the secondary storage device. The recorder stores media files corresponding to the digital media data of the removable storage medium on the primary storage device. To reduce playback latency when media tracks are selected for playback during the recording process, the recorder automatically stores only predetermined portions of each media file read from the storage medium on the primary storage device when the removable storage medium is, for example, initially engaged with the secondary storage device. The preemptive recording may also occur at times other than the time at which the removable storage medium is initially engaged with the secondary storage device. Further, preemptive recording may be limited to the media files selected by the user for complete recording from the secondary storage device to the primary storage device.

Various examples of such a media system are disclosed. In one system, the primary storage device comprises an optical reader that is capable of reading digital media data from an optical disk, such as an audio CD disc (CDDA), DVD video disc, DVD audio disc, super audio CD, or the like. To this end, digital audio data, such as the audio tracks of a CD, may be extracted from the CD and stored on the primary storage device, which may be in the form of a hard disk drive. The recorder may preemptively record beginning portions of each audio track, such as the first five-to-ten seconds of track audio, to the primary storage device, before proceeding with complete recording of each track to the primary storage device. When the media system detects a track selection event, such as a playback request by the user, playback may begin with the preemptively recorded section of the audio track as the remaining portions of the audio track are extracted for recording and playback. If the track selection event is directed to a track that has been preemptively recorded, the playback latency may be reduced compared to other systems that require complete recording of a track before the track may be selected by the user for playback.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
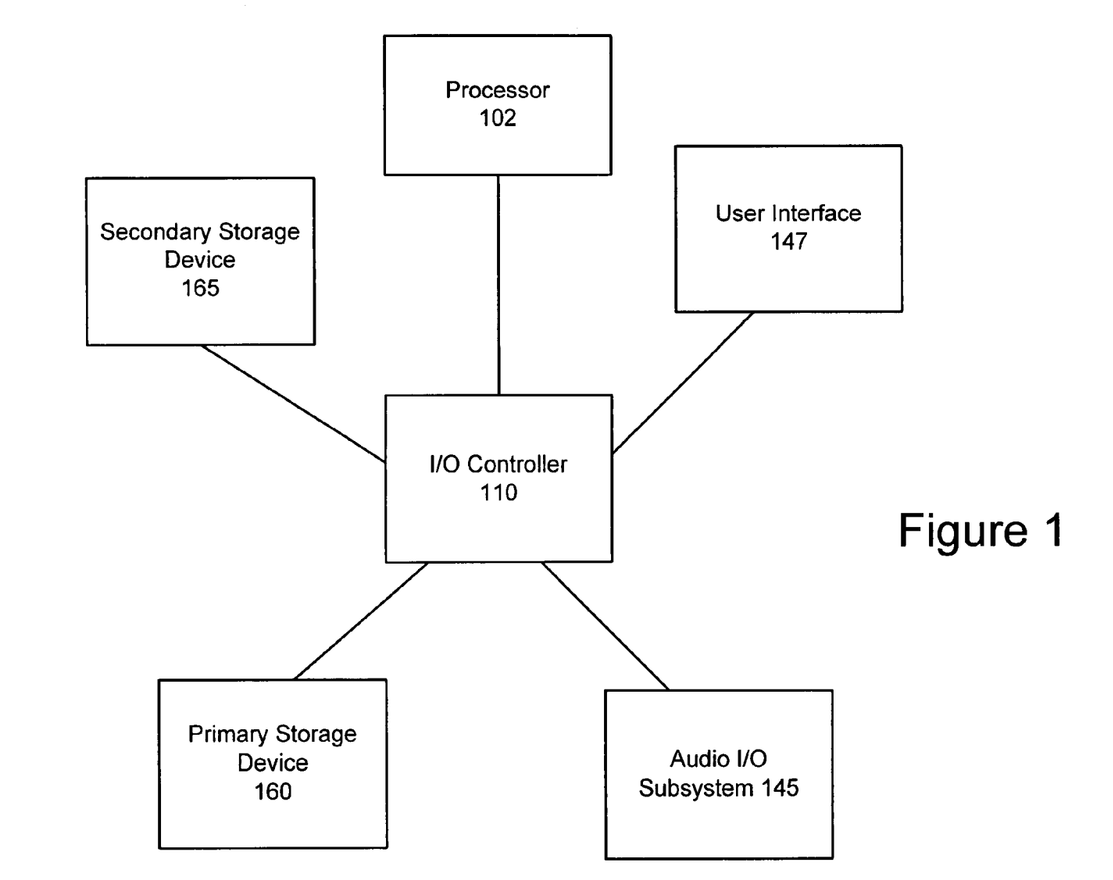
FIG. 1 is a schematic block diagram of a media system.

FIG. 1 shows a hardware platform that may be used to implement a media system 100. In FIG. 1, the media system 100 includes a central processor 102 that may be connected to an I/O controller hub 110. The I/O controller hub 110 may be used to provide communication between the processor 102 and a variety of peripheral components. In FIG. 1, the peripheral components include a user interface 147, a primary storage device 160, a secondary storage device 165 and an audio I/O subsystem 145.

Interface 147 provides a point of interaction or communication between a user and the system 100. For example, interface 147 may include a display and a number of different push buttons or the like. The display may be used to prompt the user for data and/or control input while the buttons may be used to enter the data and/or control input. Interface 147 additionally, or in the alternative, may include a video display and keyboard such as those used in personal computer systems. Playback, track selection, fast-forward, fast-reverse, record, and playback volume, without limitation, are among the many control inputs that may be initiated through the buttons or other input devices of the user interface 147. Similarly, song/media selection lists, song/media names, song/media artists or other media information may be provided on the display of user interface 147. The information and prompts displayed to the user as well as the media that is selected by the user for playback through the system 100 may be coordinated with one another through software executed by the processor 102.

The media system 100 includes a primary storage device 160 and a secondary storage device 165. The primary storage device 160 may include a device where information is kept such as one or more hard disk drives that are used to store files containing media such as video and/or audio. The files of the primary storage device 160 may be stored in one or more predetermined data formats that, for example, may include lossy as well as lossless formats. For example, the primary storage device 160 may include audio files that have been encoded using MP3, ADPCM, FLAC, and/or VORBIS codecs. Additionally, WAV and/or AIFF audio files may be stored on device 160.

The secondary storage device 165 may be adapted to access media files, such as digital audio and/or digital video files, that are stored on a removable storage medium. The removable storage medium, for example, may be an optical medium. In such instances, the secondary storage device 165 may include one or more optical disk drives. The disk drives may be capable of reading and/or writing audio CD disks, audio DVD disks, super audio compact disks, video DVD disks, video CD disks, multimedia CD disks, and multimedia DVD disks. The formats used to store the media files on the optical medium may be selected from the same formats used to store media files on the primary storage device 160. The secondary storage device 165 may be adapted to access, without limitation, CD audio disks formatted in accordance with the Redbook specification. Similarly, the secondary storage device 165 may be adapted to access DVD video disks that have been formatted in a standard manner used to commercially distribute movies.

Figure 2:
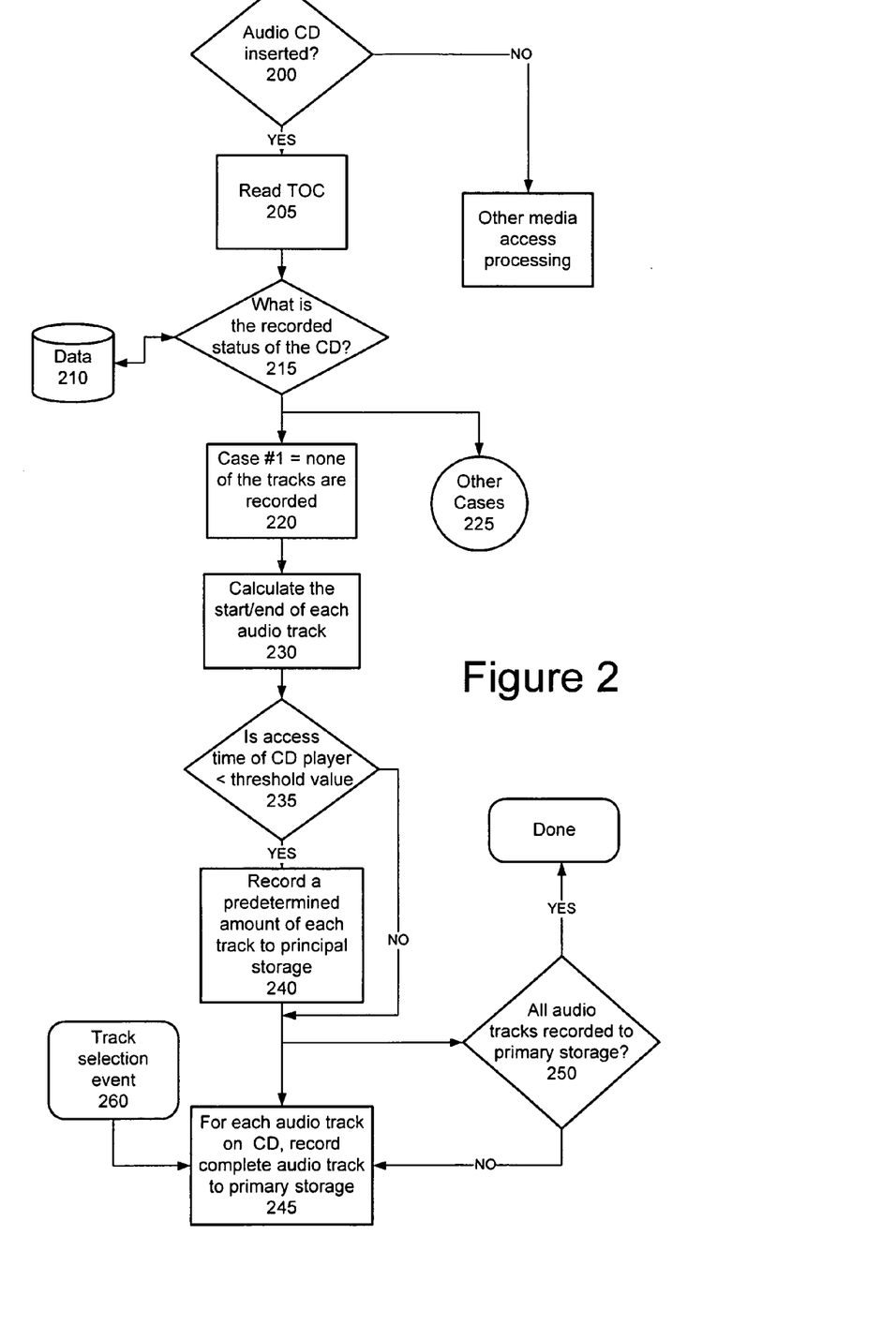
FIG. 2 shows interrelated processing operations that may be used to record media to the primary storage device of FIG. 1.
Figure 3:
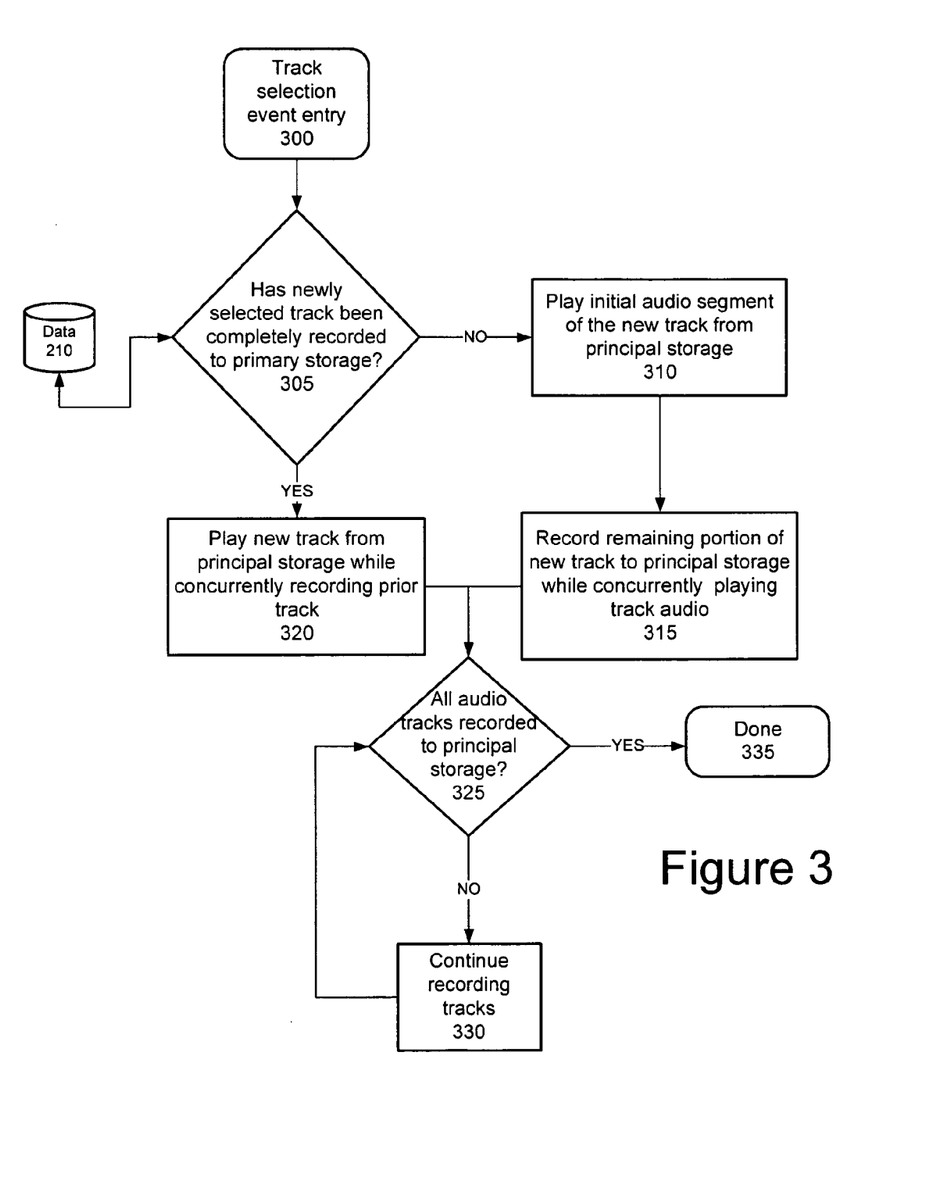
FIG. 3 shows interrelated processing operations that may be used to respond to a track selection event.
Figure 4:
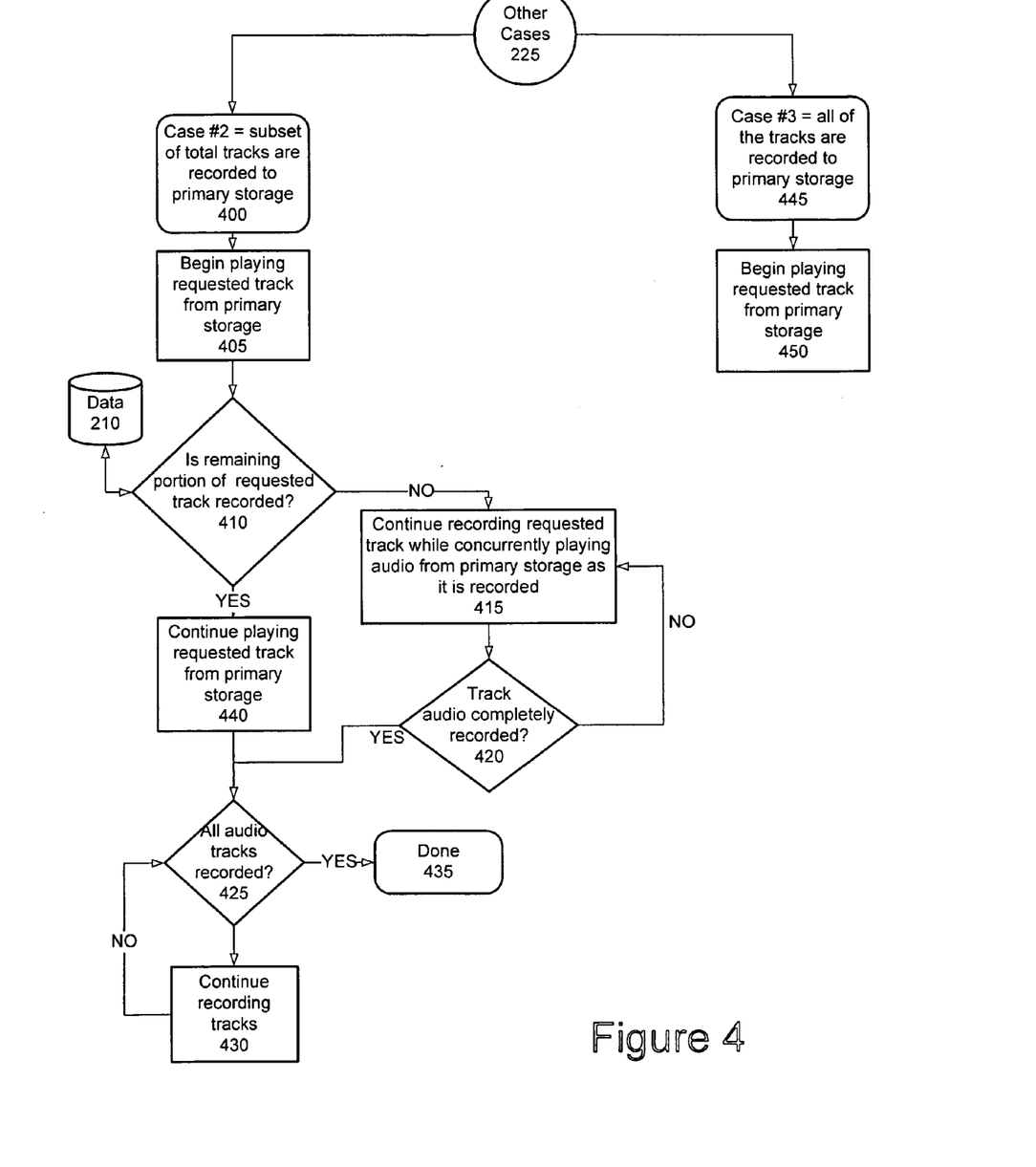
FIG. 4 shows interrelated processing operations that may be executed in response to insertion of removable media into the secondary storage device shown in FIG. 1.

Media files on the secondary storage device 165 may be recorded to the primary storage device 160 and played through the audio I/O subsystem 145. In the following examples, it is assumed that audio files of an audio CD are to be recorded to the primary storage device 160, and that each audio file stored on device 160 corresponds to a track of the audio CD. FIGS. 2 through 4 show processing operations that may be used to accomplish this function. The operations may be implemented through software that is executed on the hardware platform such as that shown in FIG. 1. However, other hardware/software combinations may also be used to implement the media system 100 and the preemptive digital data extraction operations.

The exemplary process begins at operation 200, where the media system 100 determines whether an audio CD (or other media storage medium) has been inserted into the secondary storage device 165. Upon insertion of an audio CD, the media system reads the table of contents of the audio CD at operation 205.

At operation 215, the recorded status of the CD may be checked to determine whether one or more of the audio tracks of the CD have been previously recorded to the primary storage device 160. To this end, the system 100 may query database 210. The result of the database query may be used to set the appropriate case scenario for subsequent processes.

The first case scenario, Case #1, is shown at operation 220. In this scenario, none of the tracks of the audio CD have been previously recorded. Some other cases are indicated at link 225, which continues on FIG. 4.

At operation 230, the system 100 calculates the starting point and ending point of each audio track. These calculations may be stored in a record or corresponding file on the primary storage device 160 for subsequent use in accessing the tracks at the proper location on the audio CD.

The system 100 may compare the access time of the secondary storage device 165 to a predetermined threshold value at operation 235. This comparison may be implemented in real-time, near real-time, or after a delay by measuring the access time to determine whether it is equal to or above the threshold value. In another implementation, operation 235 may be deemed unnecessary provided that the access time is known to be sufficiently low to proceed to operation 240. In either instance, operation 240 may be skipped if the access time is below a particular threshold value.

Operation 240 involves recording a predetermined portion of each audio track (or each audio tracks selected for recording by the user) of the audio CD to the principal storage device 160. For example, about the first 5-10 seconds of each audio track may be preemptively recorded to the principal storage device 160 to reduce subsequent playback latency. As each track is preemptively recorded, a corresponding entry of this fact may be provided in the media database 210 for use in subsequent processing operations.

Once the preemptive recording of the tracks at operation 240 is completed or almost completed, the system 100 may begin recording complete audio tracks at operation 245. The sequence in which the audio tracks are completely recorded from the audio CD to the primary storage device 160 may vary. In a relatively simple form, the system 100 may begin complete recording in a sequential manner, for example, starting with the lowest number audio track and proceeding until the highest number audio track has been recorded. When an audio track has been completely recorded to the primary storage device 160, the system 100 checks at operation 250 to determine whether all audio tracks of the CD have been transferred. If not, the recording process returns to operation 245. After all audio tracks that are requested have been recorded, the process terminates at operation 255.

Processing operations 245 through 255 are executed in the foregoing manner assuming that a track selection event does not occur. However, in some instances the user may wish to play back a track during the recording process. Further, the user may wish to switch between tracks during the recording process. To this end, a track selection event 260 may occur such as the one shown in FIG. 2. FIG. 2 represents, for example, a change in the track that is played back through the system 100. The track change may be initiated by the user through the user interface 147, which may include a point of connection to push buttons, switches, or the like, that allow the user to advance through the audio tracks in either the forward or reverse directions. Another type of track selection event occurs when the audio from one track has been completely or almost completely played and the audio for a subsequent track has been queued for playback.

FIG. 3 illustrates how the media system 100 may respond to a track selection event. When a track selection event 260 occurs, the media system 100 may execute a track selection event process at operation 300. At operation 305, the system 100 checks the media database 210 to determine whether the newly selected track has been completely recorded or almost completely recorded to the primary storage device 160. If it has not been fully recorded or almost completely recorded, the initial audio segment of the newly selected track stored at operation 240 is played back at operation 310 from the principal storage device 160 and the remaining portion of the newly selected track is completely transferred to principal storage device 160 at operation 315. Playback of the newly selected track beyond the initial audio segment may continue from the principal storage device 160 since the recording process has a head start on the playback process. Additionally, the recording process and playback process may occur concurrently when the access time of the secondary storage device 165 is below the threshold that is checked at operation 235. If the newly selected track has previously been fully recorded to the principal storage device 160, the media system 100 may continue recording the previously selected track at operation 320 until the previously selected track has been completely transferred to the principal storage device 160. The newly selected track is played as the previously selected track is concurrently recorded to the primary storage device 160. Alternatively, complete recording of requested tracks may proceed in accordance with another track sequence.

In either instance, once the previously selected track is completely or almost completely recorded at operation 320 or the newly selected track is completely or almost completely recorded at operation 315, the media system 100 checks to determine whether all audio tracks have been recorded to the principal storage device 160 at operation 325. If not, the tracks that have not been recorded are transferred to the principal storage device 160 at operation 330. If all tracks have been recorded, the process may terminate at operation 335.

FIG. 4 illustrates other cases that may occur at link 225 of FIG. 1. In Case #2, as shown at operation 400, a check of the media database 210 indicates that only a subset of the total number of tracks of the CD have been previously recorded to the primary storage device 160. It is assumed that the user has requested playback of a particular track when the CD was inserted into the secondary storage device 165. Accordingly, the media system 100 begins playing the requested track from the primary storage device 160 at operation 405. A check is made at operation 410 to determine whether the remaining portion of the requested track has been recorded to the primary storage device 160. The record for the requested track may be accessed from media database 210 to make this determination. To this end, the media database 210 may include one or more fields indicating whether a given audio track has been partially recorded or completely recorded.

The course taken by the process of FIG. 4 depends on whether the requested track has been completely recorded or only partially recorded to the primary storage device 160. If the audio track only has been subject to partial recording, complete recording of the track as it is played back by the media system 100 takes place at operation 415. At operation 420, the media system 100 monitors the recording process for completion. When recording of the requested track has been completed, a check is made at operation 425 to determine whether all of the audio tracks of the CD have been recorded to the primary storage device 160. If not, recording of the remaining audio tracks may continue at operation 430 until all requested tracks of the CD have been completely recorded, at which point the process is completed at operation 435.

If a determination is made at operation 410 that the requested audio track has been completely recorded to the primary storage device 160, the media system 100 continues playing the requested track from the primary storage at operation 440. While the requested track is playing, the media system proceeds to operation 425 to determine whether all of the audio tracks of the CD have been recorded to the primary storage device 160. If not, recording of the remaining audio tracks continues at operation 430 until all tracks of the CD have been completely or almost completely recorded, at which point the process is completed at operation 435.

In Case #3, as shown at operation 445, it is assumed that all of the tracks of the CD have been recorded to the primary storage device 160. The media system 100 may respond to the insertion of a CD that has been completely recorded as though the user requested playback of the audio files from the primary storage device 160. This operation is illustrated at operation 450. Alternatively, the media system 100 may respond to the insertion of the CD as though the user has requested re-recording of one or more of the audio tracks to the primary storage device 160. To this end, the user may be prompted through the user interface 147 to select which audio tracks, if any, are to be re-recorded. Otherwise, prompting of the user may be skipped and re-recording of all tracks begun in the manner shown in FIG. 1. This latter option may be useful in those instances in which one or more of the audio files stored on the primary storage device 160 have become corrupted.

The sequence in which audio files are preemptively recorded may be optimized in accordance with a track selection probability density function. This increases the likelihood that a track selected for playback by the user will have a corresponding initial audio segment on the primary storage device 160 when the user initiates or the system otherwise experiences a track selection event. As a result, the likelihood that a user will or may experience unacceptable latency between track selection and the start of track playback will be reduced as well. The sequence in which complete audio tracks are recorded from the CD to the primary storage device 160 may also be optimized in accordance with a track selection probability density function. The probability density function may be the same as the one used for preemptive recording or may be different and determined from other design criterion.

Figure 5:
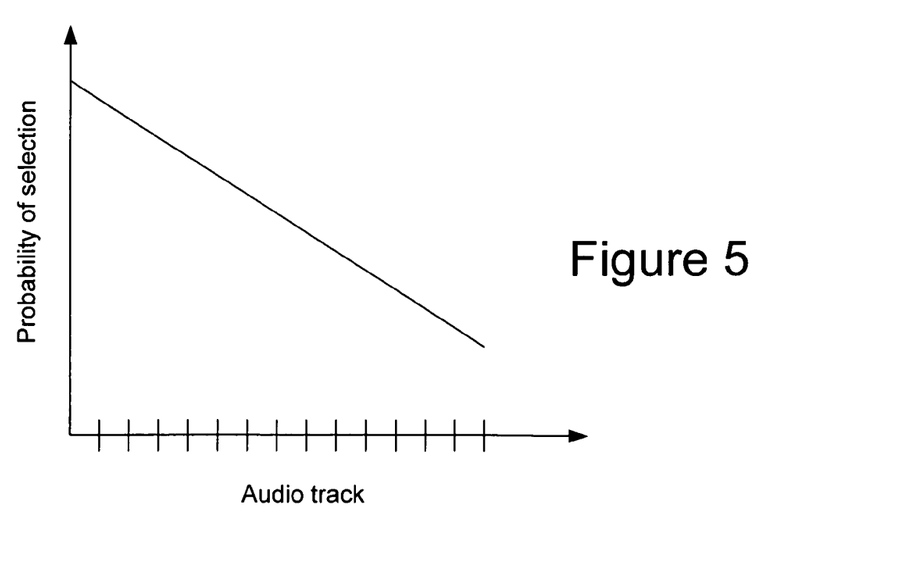
FIG. 5 shows a track selection probability density function that may be used in the media system of FIG. 1.

One probability density function is shown in FIG. 5, which is a plot showing the probability that a particular track will be selected by the user versus the audio track number. In this exemplary profile, it has been assumed that the average CD includes fifteen audio tracks. The plot of FIG. 5 illustrates a probability density function in which the probability of selection linearly declines with increasing audio track number. In such instances, preemptive recording may begin with the lowest number track and proceed incrementally, track by track, until the highest numbered track has been preemptively recorded, after which the media system 100 may proceed with complete recording of each audio track in either a calculated sequence or other predetermined sequence. It will be recognized, however, that other probability density functions may also be employed.

Figure 6:
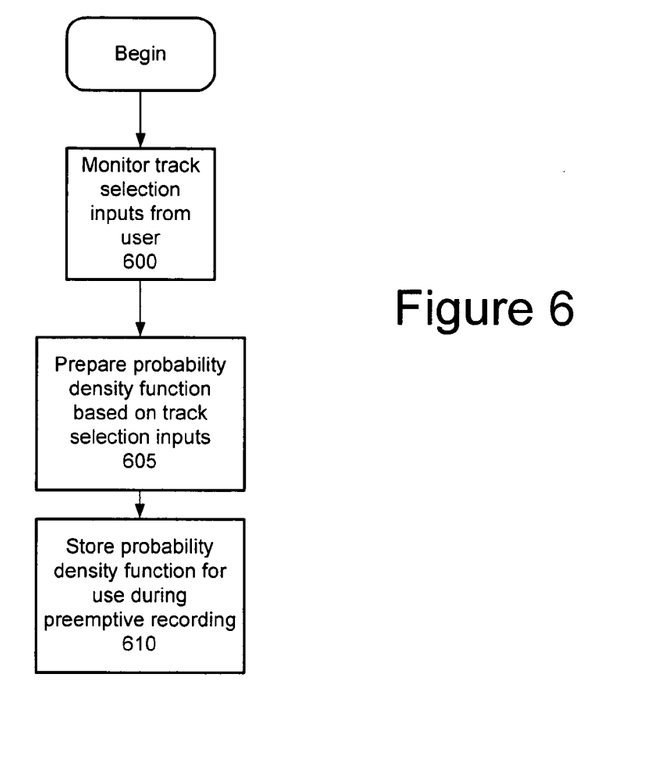
FIG. 6 shows interrelated processing operations that may be used to generate a track selection probability density function.

A probability density function may also be derived from the operating habits of the user. For example, the media system 100 may monitor which audio track numbers are most frequently selected by the user. One manner in which this may be done is shown in FIG. 6.

In this exemplary process, the system 100 monitors track selection inputs from the user at operation 600. A record of the track selection inputs from the user may be maintained, for example, in a file table or the like on the primary storage device 160. The media system 100 may wait until a predetermined number of track selection inputs have been detected before proceeding to operation 605, at which point the media system 100 derives a probability distribution function from the track entry data. Waiting until a predetermined number of selection inputs have been detected may assist in increasing the accuracy of the probability distribution function. The resulting probability density function may be stored at operation 610 for subsequent use during the preemptive recording operation 240 of FIG. 2. Similarly, the recording of complete audio files at operation 245 of FIG. 2 may access the resulting probability density function to determine the sequence in which the audio tracks are to be completely recorded to the primary storage device 160. Although this example illustrates the generation of a probability density function, other probability distribution methods may be used to determine the sequence of the preemptive recording and/or complete recording. The particular probability determination that is used may be dependent on design constraints imposed by the requirements of the system 100.

Figure 7:
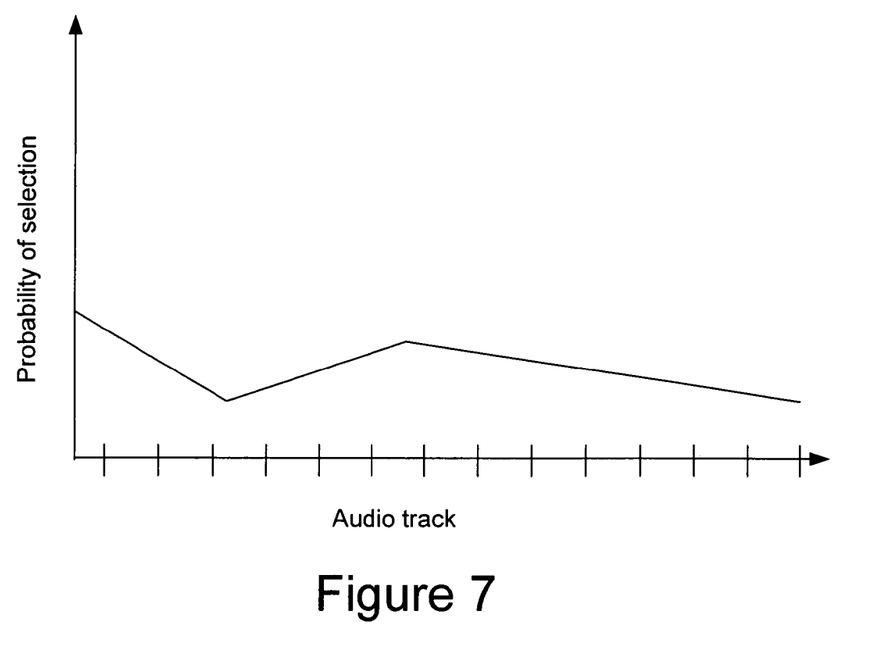
FIG. 7 shows another track selection probability density function that may be used in the media system of FIG. 1.

An exemplary probability density function derived by monitoring the track selection habits of the user is illustrated in FIG. 7. In this example, audio track 1 has the highest probability of selection. Accordingly, the media system 100 may begin preemptive recording of a CD with audio track 1. The audio track having the next highest probability of selection in this example is audio track 8. Consequently, the media system 100 may continue preemptive recording of a CD with audio track 8 once the preemptive recording of audio track 1 is completed. Once audio track 8 has been preemptively recorded, the preemptive recording process continues with audio tracks having successively lower selection probabilities. Audio tracks having lower selection probabilities are preemptively recorded after audio tracks having higher selection probabilities until all audio tracks have been preemptively recorded. A similar process sequence may be followed for complete recording of the audio tracks to the primary storage device 160.

The media on the primary storage device 160 may be stored using one or more lossless or lossy compression formats. Lossy compression formats may be used in those instances in which the number of media files per storage unit on the primary storage device 160 (i.e., audio files/megabyte) is to be maximized. In these instances, lossy compression formats, such as the MP3 format, may be used. Encoding of the audio file to the appropriate format may be executed by, for example, processor 102 during the recording process as each audio track is transferred to the primary storage device 160. Alternatively, each audio track may be recorded to a corresponding media file in a lossless compression format and subsequently encoded to a lossy format to reduce the amount of storage space utilized by the file. The particular lossy and/or lossless compression format that is to be used by the media system 100 to record audio tracks from the secondary storage device 165 may be selected by the user through the user interface 147.

The audio subsystem 145 shown in FIG. 1 also may include components that are suitable for playing back audio files that have been stored using one or more compression formats. In the exemplary audio subsystem 145, audio may be played from the primary storage device 160. It will be recognized, however, that other system designs may use the secondary storage device 165 as the principal playback device.

While the foregoing processing sequences have included preemptive recording of audio track files, it will be recognized that such sequences may likewise be adapted to preemptively record and playback other media files, such as DVD video and its corresponding audio. When applied to DVD video, predetermined portions of various video chapters of the DVD may be preemptively recorded in the manner described above.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A media system comprising:
a primary storage device having a first plurality of files containing first media stored in a first data format;
a secondary storage device capable of reading removable storage media, the removable storage media having a second plurality of files containing second media stored in a second data format, where the second plurality of files of the secondary storage device are logically arranged on the removable storage media in a plurality of corresponding tracks;
a media player that plays the first plurality of files from the primary storage device; and
a media recorder that converts the second plurality of files of the secondary storage device to the first data format and stores the converted second plurality of files to the primary storage device, where the media recorder automatically converts and stores a predetermined portion of each track of two or more tracks of the plurality of corresponding tracks of the removable storage media to the primary storage device prior to converting and storing all portions of each track of the two or more tracks of the plurality of corresponding tracks thereby reducing an initial playback latency of the two or more tracks of the plurality of corresponding tracks during playback by the media player when a first track of the two or more tracks of the plurality of corresponding tracks is selected for playback,
where, in response to the first track being selected for playback, the media recorder determines whether all portions of the first track have been converted and stored onto the primary storage device, and
where, if the media recorder determines all portions of the first track have not been converted and stored onto the primary storage device and the media recorder is converting and storing a second track of the two or more tracks, the media recorder preempts the conversion and storage of the second track and converts and stores the first track from the removable storage medium to the primary storage device while the media player plays the first track from the primary storage device.

2. The media system of claim 1 where the predetermined portion of each track of the two or more tracks of the plurality of corresponding tracks comprises a beginning portion of each track of the two or more tracks of the plurality of corresponding tracks.

3. The media system of claim 1 where the predetermined portion of each track of the two or more tracks of the plurality of corresponding tracks comprises approximately five seconds of a beginning section of each track of the two or more tracks of the plurality of corresponding tracks.

4. The media system of claim 1 where the secondary storage device is capable of reading an optical disk selected from a group consisting of a CD audio disc, a DVD audio disc, a super audio compact disc, a DVD video disc, a CD video disc, a CD multimedia disc, and a DVD multimedia disc.

5. The media system of claim 4 where the primary storage device comprises a fixed media storage drive.

6. The media system of claim 5 where the primary storage device comprises a hard disk drive.

7. The media system of claim 1 where the first plurality of files on the primary storage device comprise a plurality of audio files.

8. The media system of claim 7 where the first data format comprises a compressed audio format.

9. The media system of claim 8 where the compressed audio format is selected from a group of compressed audio formats consisting of an MP3 format, an ADPCM format, a FLAC format, and a VORBIS format.

10. The media system of claim 8 where the second data format comprises a lossless audio compression format.

11. The media system of claim 1 and further comprising a user interface having at least a track selection input, where the media player plays one or more files of the second plurality of files corresponding to a given track of the plurality of corresponding tracks of the removable storage media in response to the track selection input, and where the media player begins playing the given track of the plurality of corresponding tracks using the predetermined portion of the given track of the plurality of corresponding tracks stored on the primary storage device.

12. A media system comprising:
a primary storage device capable of storing a plurality of compressed audio files in a first data format;
an optical disk reader capable of reading a plurality of audio files from an optical medium using a second data format, where the plurality of audio files are logically arranged in a plurality of audio tracks;
a media player that plays the plurality of compressed audio files of the primary storage device; and
a media recorder that converts the plurality of audio files read by the optical disk reader to the first data format and stores the converted plurality of audio files in a plurality of corresponding compressed audio files on the primary storage device, where the media recorder automatically converts and stores a predetermined audio portion of each audio track of two or more audio tracks of the plurality of audio tracks on the primary storage device prior to conversion and storage of all audio portions of each audio track of the two or more audio tracks of the plurality of audio tracks on the primary storage device;
where, in response to a track selection event in which a first audio track of the plurality of audio tracks of the optical medium is selected for playback, the media player determines whether all portions of the first audio track have been converted and stored from the optical medium to the primary storage device;
where, if the media player determines that all portions of the first audio track have not been converted and stored from the optical medium to the primary storage device, the media player directs the media recorder to preempt any ongoing conversion and storage of the plurality of audio tracks of the optical medium in favor of conversion and storage of the selected first audio track so that the media recorder continues conversion and storage of the selected first audio track; and
where the media player begins playback of the first audio track using the predetermined portion of the first audio track stored on the primary storage device as the media recorder continues conversion and storage of the first audio track from the optical medium to the primary storage device.

13. The media system of claim 12 where the predetermined portion of each audio track of the plurality of audio tracks comprises a beginning portion of each audio track of the plurality of audio tracks.

14. The media system of claim 12 where the predetermined portion of each audio track of the plurality of audio tracks comprises approximately five seconds of a beginning section of each audio track of the plurality of audio tracks.

15. The media system of claim 12 where the optical disk reader is capable of reading an optical disk selected from a group consisting of a CD audio disc, a DVD audio disc, and a super audio compact disc.

16. The media system of claim 12 where the primary storage device comprises a hard disk drive.

17. The media system of claim 12 where the first data format comprises a compressed audio format and is selected from a group of compressed audio formats consisting of an MP3 format, an ADPCM format, a FLAC format, and a VORBIS format.

18. The media system of claim 17 where the second data format comprises a lossless audio compression format.

19. The media system of claim 12 and further comprising a user interface having at least an audio track selection input, where the media player plays one or more compressed audio files of the plurality of compressed audio files corresponding to a given audio track of the plurality of audio tracks of the optical medium in response to the audio track selection input, and where the media player begins playing the given audio track of the plurality of audio tracks using the predetermined portion of the given audio track of the plurality of audio tracks stored on the primary storage device.

* * * * *